Aug. 5, 1958  H. BERGER  2,846,588
X-RAY SHUTTER APPARATUS
Filed July 21, 1953  5 Sheets-Sheet 1
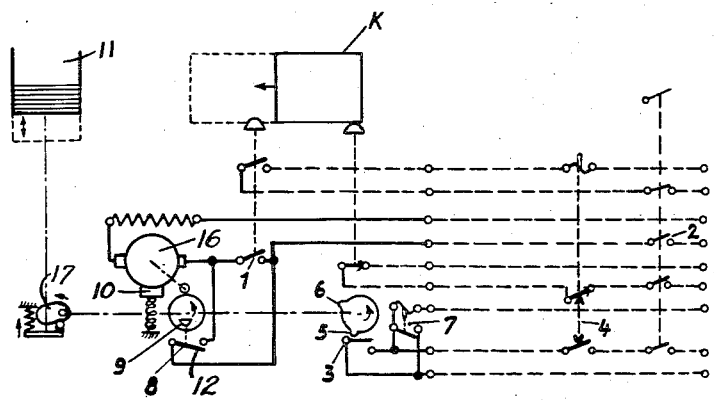
Fig. 1
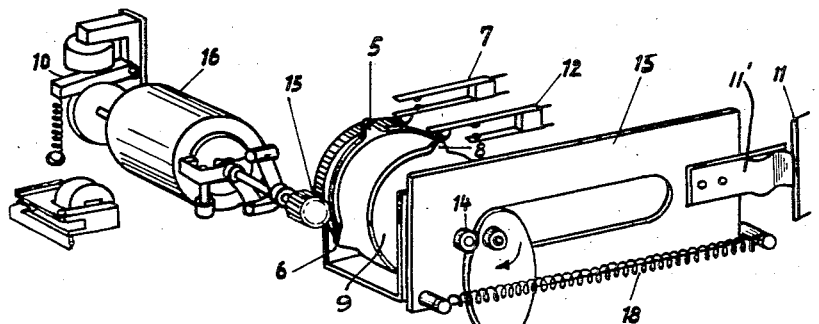
Fig. 2

Aug. 5, 1958

H. BERGER 2,846,588

X-RAY SHUTTER APPARATUS

Filed July 21, 1953

Inventor:
Helmut Berger
By
Atty

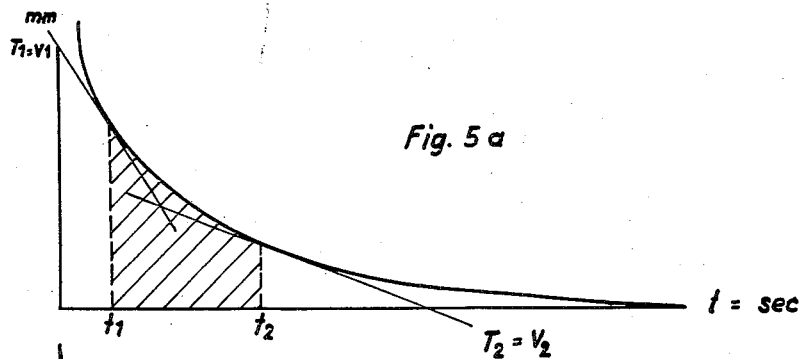
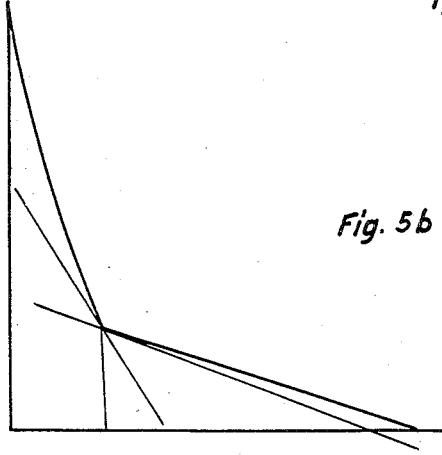
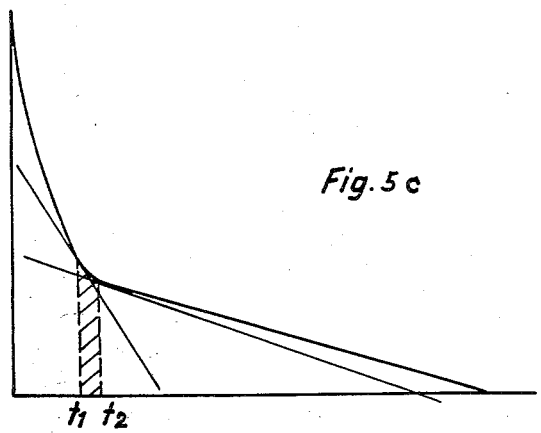

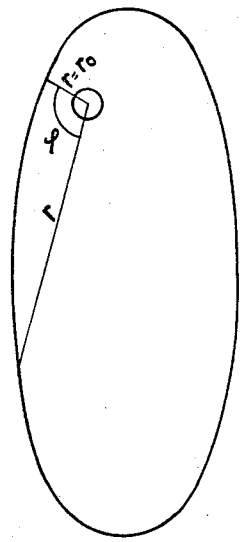
Fig. 7a
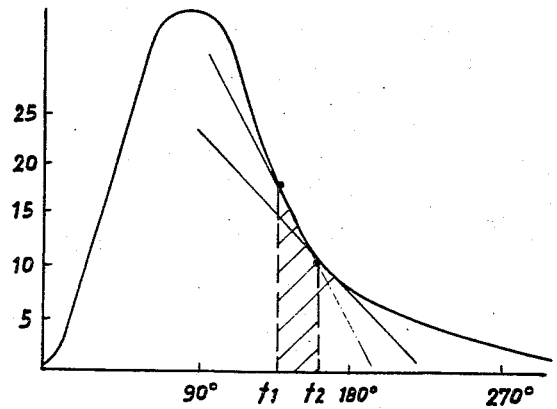
Fig. 7b
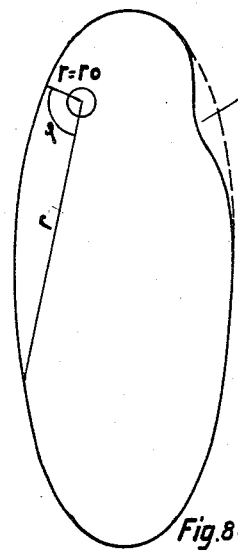
Fig. 8a
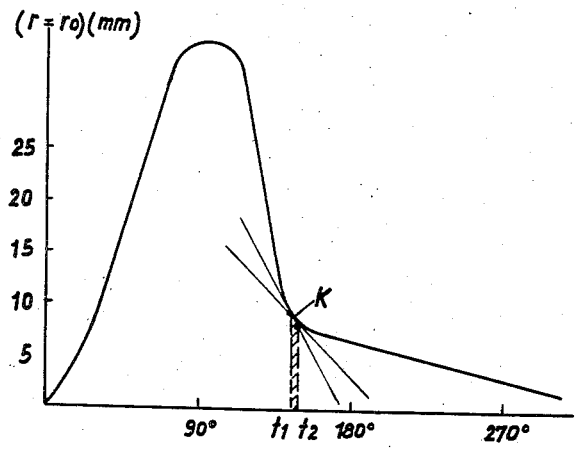
Fig. 8b
Inventor:
Helmut Berger

United States Patent Office 2,846,588
Patented Aug. 5, 1958

2,846,588

X-RAY SHUTTER APPARATUS

Helmüt Berger, Erlangen, Germany, assignor to Siemens-Reiniger-Werke Aktiengesellschaft, Erlangen, Germany, a corporation of Germany Application July 21, 1953, Serial No. 369,305

Claims priority, application Germany July 26, 1952

19 Claims. (Cl. 250—62)

This invention relates to X-ray shutter apparatus and is particularly concerned with X-ray apparatus comprising a device for screening secondary radiations from the photographic element which may be a film or plate, said device comprising a screening shutter which executes a periodic reciprocating motion produced by a preferably electric motor with means for converting the rotary motion into the reciprocating motion.

In known apparatus of this kind the periodic reciprocating motion of the shutter is usually produced by means of cardioid gears which impart to the shutter a substantially uniform motion characteristic except at the reversing point of the corresponding motion. The duration of the shutter motion is identical in both directions of operation. A contact may be controlled by the motion of the shutter which causes blocking of the exposure during the reversal of the motion so as to avoid picturing of the shutter grid while standing still.

This intermittent blocking of the exposure which must be of considerable duration due to the slow reversal, especially when using shutters with sine-motion characteristic, is very disturbing for the physician because, incident to aiming operation, that is switching the apparatus on and off by contacts controlled by the plate holder, he may insert the plate holder during an interval when exposure is blocked, and the actual desired exposure will accordingly be effected at another instant than expected. The cardioid gears require shorter blocking intervals than sinusoidal gears due to the quicker change of motion, but they have the disadvantage of a very strongly accelerated motion at the reversing point resulting in vibration of the apparatus. It is, moreover, in both kinds of motions unavoidable to prevent after initiation of an exposure that a reversal in the motion will occur during such exposure, if such exposure exceeds a certain interval. This is due to the fact that short exposures must be switched in a quick phase of the motion, necessitating in the case of sinusoidal gears a shifting of the switching-in point to the middle of the path of motion of the shutter where the greatest speed is reached. The grid-free picturing requires with direct current operation and with ideally uniformly positioned shutter only a motion thereof by a subdivision increment (lead strip intermediate space) but in the uniformity of shutters now technologically obtainable it requires greater grid motions. If the shutter is to be obliterated already at an X-ray impulse, its speed must be, with an impulse of a duration of 0.003 sec., $$v = \frac{T}{0.003}$$

at a subdivision T of the shutter 0.5 mm., that is, $$\frac{0.5}{0.003} = 167 \text{ mm./sec.}$$

A blocking of the exposure is unnecessary with shutters moving in one direction, for example, by means of a spring drive acting against an oil pressure brake. Such shutters are, however, very expensive because they require for satisfactory and trouble-free operation a spring motor and in addition an oil pressure brake with a check valve and an oil expansion element.

The invention avoids the drawbacks of the periodic blocking of the exposure as well as the costly expenditure for the operation of the shutter.

In the X-ray apparatus according to the invention, comprising a shutter which is by a motor periodically reciprocated, this is obtained by means which move the shutter with decreasing speed in one direction of motion and by means which cause the release or initiation of the X-ray exposure with the shutter moving in the indicated direction with decreasing speed. The shutter is advantageously moved, in the corresponding direction of motion, initially with high speed, above stroboscopic speed, and thereafter with decreasing speed lying below stroboscopic speed. The motion range at substroscopic speed is advantageously chosen so that it amounts to a multiple of the motion range at superstroboscopic speed.

With such sequence of motion of the shutter, there will be at the transition from the greater to the lesser speed, a point of passage through a critical speed in which occurs a stroboscopic effect, namely, a picturing of the shutter grid. The danger of grid picturing is especially present when the transition from the superstroboscopic to the substroboscopic speed is relatively slow and when the shutter moves for a prolonged period within a speed range which may give rise to stroboscopic picturing.

The stroboscopic picturing is prevented by the invention by the provision of means which cause the transition from superstroboscopic to substroboscopic speed of the shutter to be so fast that there is practically no stroboscopic effect at the instants of X-ray exposure.

In accordance with another feature, the invention provides means which cause the duration of the shutter motion in the direction with decreasing speed to be greater than in the opposite direction.

A further object and feature is to provide means for releasing the X-ray exposure within the range of the motion at superstroboscopic speed, preferably shortly after reaching such range.

Still another object is to provide means for effecting the release of the X-ray exposure within the range of motion of the shutter in which it moves in a direction opposite to the direction of motion with decreasing speed.

The foregoing objects and additional objects and features will be brought out in the following description with reference to the accompanying drawings showing in schematic manner embodiments of the invention. In these drawings.

Fig. 1 is a circuit diagram showing an electrically operated shutter drive with electrically actuated release means;

Fig. 2 shows an embodiment of the drive and release means;

Figs. 5a, 5b, 5c show a part of the motion characteristic for reduced speed of motion;

Figs. 7a, 7b represent respectively a cam and motion characteristic resulting from the operation thereof; and Figs. 8a and 8b show respectively another cam and motion characteristic resulting from the operation thereof.

Figure 3:
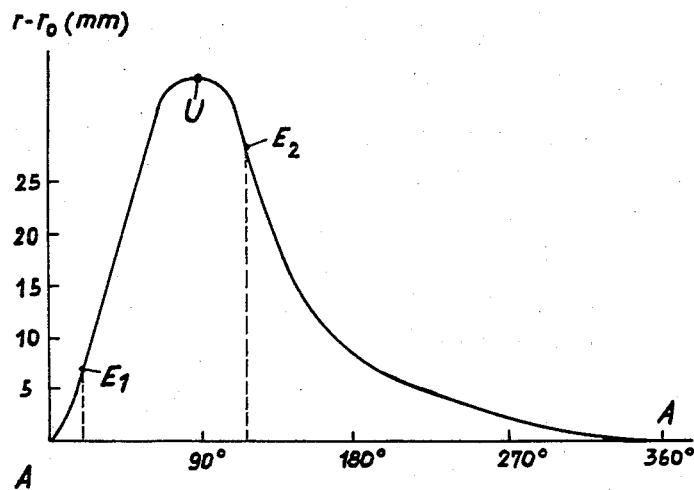
Fig. 3 represents the relative motion of the shutter.

As shown in Fig. 1, there is provided a switch-in contact 1 for a small electric motor 16 which may be controlled, for example, by a plate holder K. This contact will be closed upon the insertion of the plate holder K into exposure position and will be opened upon completion of the exposure, the corresponding operation being referred to as aiming operation. In parallel with the switch-in contact 1 is a contact 12 which is opened by a cam 8 of a motor-driven disk 9 at a defined phase of motion, thereby disconnecting the motor circuit at open switch-in contact, that is, upon completion of the exposure. The subsequent inertia operation of the motor may be held within predetermined limits by a brake 10. For the release of the exposure there is provided a contact 3. In the illustrated example, there is used a cam having two actuating elevations, corresponding to the two switch-in points E1 and E2 of Fig. 3. The elevation 5 closes contact 3 with slight delay while contact 4 is in closed position, and the elevation 6 closes contact 3 at the switch-in point E2 while contact 4 closed, the delay amounting to 0.8 sec. A contact 7 of a switching relay (not shown) bridges the contact 3 until the exposure is completed.

In the schematically illustrated drive and release device shown in Fig. 2, the shutter 11 for screening the secondary radiations, is connected with a plate 13 by way of a spring 11′, the plate 13 carrying a roller 14. A cam 17 is coupled with the electric motor 16 over means 15. The roller 14 is held in engagement with the cam 17 by means of a spring 18. The shutter 11 is reciprocated by means of the cam 17, resulting in a motion characteristic which will be explained with reference to Fig. 3.

In Fig. 3, the angular subdivision of the abscissa which corresponds to a rotation of the cam on the shaft of a synchronous motor, that is, to a cycle with full reciprocating motion, is plotted against the spacing of the shutter from its initial position. If a suitable time-measure is taken for the abscissa in place of the angular increments (cycle duration 1.6 sec.), the rise of the curve will give the shutter speed in mm./sec. At the stopping point A is prevented an excessive increase of speed and therewith vibration of the apparatus, and approximately at $E_1$, corresponding to the switch-in point released by the cam elevation 5 (Figs. 1 and 2), there will be reached a speed sufficient for a short exposure. An excessive change of speed is also avoided at the reversing point U, and the reversal is such that there is provided, approximately following $E_2$ (the switch-in point for the exposure released by the cam elevation 6) a shutter speed so great that it is suitable for short exposures while a slower speed is provided within a greater interval in this direction of motion. The switching-in at point $E_2$ makes it possible to produce exposures up to 1 sec. during a motion free of reciprocation, thereby avoiding the critical reversal region for exposures of median duration, while the quality of the exposures exceeding 0.8 sec. remains substantially unaffected. The defined stopping point of the motion is at the point A of the motion characteristic, and the point $E_1$ can accordingly be chosen with undelayed switching as the point for the exposure; or the exposure may be released at point $E_2$ after a short but defined delay interval of 0.8 sec. during which the operator can manipulate the preparatory circuit including heating of the X-ray tube and insertion of the plate holder.

Figure 4:
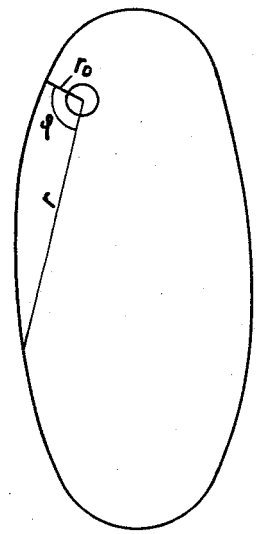
Fig. 4 illustrates a form of a cam for controlling the shutter motion.

A cam which produces the motion characteristic shown in Fig. 3 is separately illustrated in Fig. 4, the motion characteristic being in the described drive mechanism the marginal curve of the cam in polar coordinates $(r-r_0)$ in which $r_0=0$ is the zero position of the shutter. Accordingly, the described motion characteristic is produced by an ellipsoid cam with eccentrically journaled shaft which is slightly spaced (zero position) from the cam margin.

The stopping of the shutter in a defined phase position, for example, in the point A in Fig. 3 is, of course, not limited to this particular point and its immediate vicinity. It may be adjusted by means of the adjusting cam 9 (Fig. 1) to any desired point of the motion characteristic. The stopping of the shutter, in accordance with the invention, in a defined phase position, after completion of the exposure, at a reciprocating motion controlled by a cam, may be accomplished with mechanical means as described, showing but one possible embodiment available to those experienced in the art; it is understood that it may likewise be accomplished by the use of known electromagnetic or electronic means.

The motion conditions at the transition from superstroboscopic to substroboscopic speed will now be explained with reference to Figs. 5a–5c showing parts of the motion characteristic with decreasing speed of motion. The spacing of the shutter from its initial position is plotted upon the ordinate in mm. and the time $t$ is plotted upon the abscissa in sec., assuming a shutter motion in the direction of the normal or stopping position. The slope of the curve corresponds to the speed of the shutter motion.

In Fig. 5a are shown two tangents $T_1$ and $T_2$ whose slope corresponds to the speeds $v_1$ and $v_2$ of the shutter. These "border tangents" determine a stroboscopic range, that is, all inclinations and therefore speeds $v$ which are smaller than $v_2$ and greater than $v_1$ lie within the stroboscopic picturing (shaded range in Fig. 5a).

Fig. 5b represents a corresponding idealized motion characteristic in accordance with the invention. The stroboscopic range is so to speak cut out, that is, the shaded range of Fig. 5a disappears and the time interval $(t_2-t_1)$ in which the stroboscopic picturing takes place shrinks to a point. In practical application, such a kink in the motion characteristic is smoothed out by inertia effects. In other words, the kink degenerates into a sharp curve and therewith in change of speed.

As is apparent from Fig. 5c, the range $(t_2-t_1)$ is in such a case small as compared with the corresponding range of Fig. 5a.

This feature of the invention is, of course, not limited to motion characteristics with initially high and gradually decreasing speeds but may be advantageously used in connection with motion characteristics in which the advantage of the contraction or shrinking of the space in which a stroboscopic picturing takes place is not as apparent, and also in case of shutters in which the exposure falls within the range of reversal of the motion thereof.

Figure 6:
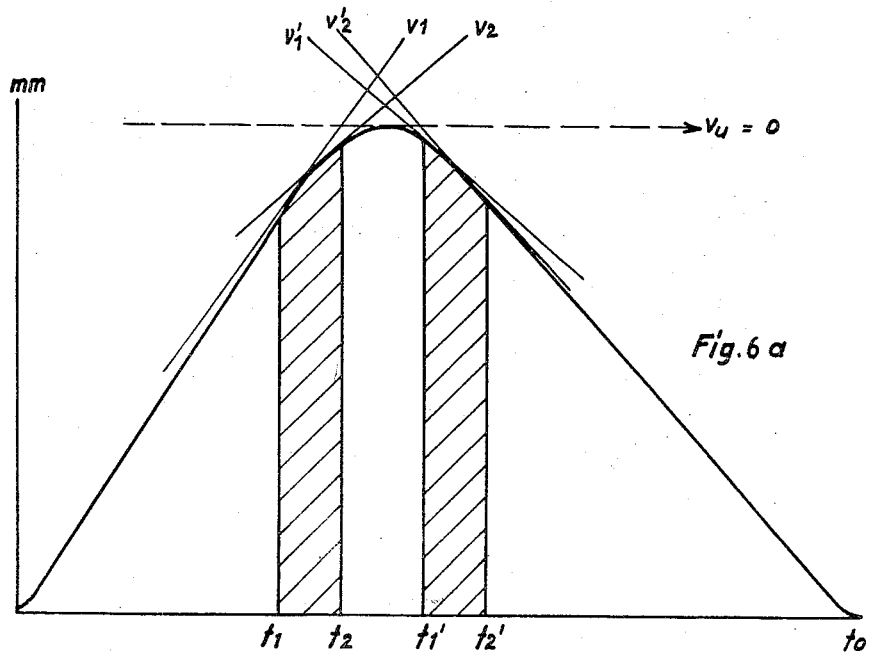
Figs. 6a, 6b illustrate a detail of the motion characteristic.
Figure 6:
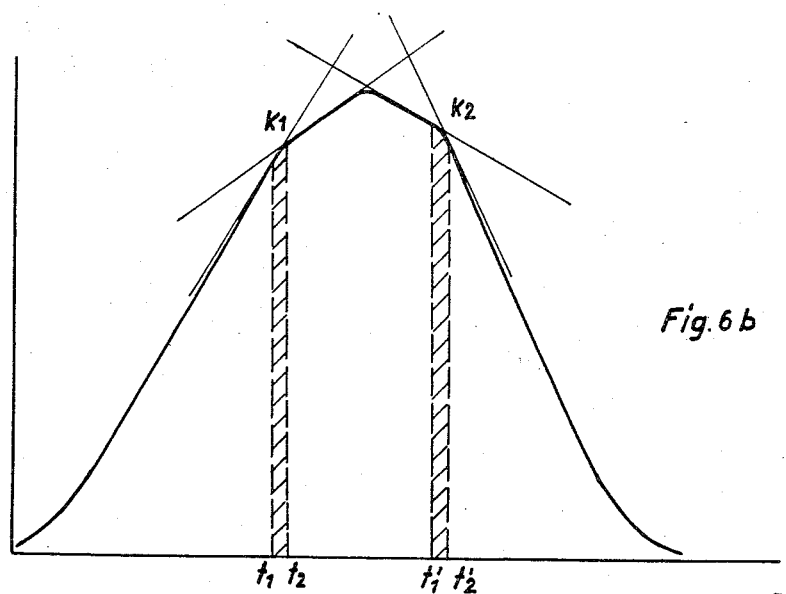

As will be seen from Fig. 6a, the shutter will then pass through two stroboscopic ranges with time intervals $(t_2-t_1)$ and $(t'_1-t'_2)$.

Fig. 6b shows how the motion characteristic is formed in accordance with the invention. The curvature caused at the points $k_1$ and $k_2$ of the curve produces also in this case a contraction or shrinking of the time intervals $(t_2-t_1)$ and $(t'_1-t'_2)$ in which a stroboscopic picturing can take place.

The drive device may, of course, be so constructed that the curve kink lies in a range in which a stroboscopic effect of higher or lower order occurs, or, if several stroboscopic ranges of different or identical order are present, which may endanger the quality of the exposures, there may be a curve kink for each such range.

The pronounced kink provided in accordance with the invention in the motion characteristic within the stroboscopic range is produced by a particular formation of the cam 17 and more especially by a depression at the point of the cam curve which corresponds to the kink. This will be apparent from Figs. 7a, 7b and 8a, 8b, the Figs. 7b and 8b showing the motion characteristics corresponding respectively to the forms of the cams 7a and 8a.

The motion characteristics are plotted in angular increments $\varphi$ (which may also serve as a time measure due to the uniform speed of rotation in accordance with the cycle duration of 1.6 sec.) against the shifting $(r-r_0)$ of the stray-radiation shutter, $r_0$ corresponding to the resting position of the shutter and $(r-r_0)$ to the spacing in mm. of the shutter from the resting position, as plotted along the ordinate. Fig. 7b gives the motion characteristic of the shutter with the two "border speeds"

($v_2-v_1$) which limit the stroboscopic range passed during the time interval $t_2-t_1$.

Fig. 8a shows a cam according to the invention having at the point K' a depression, the formation of the cam of Fig. 7a being indicated at the corresponding point by a dotted line. This depression K' produces the correspondingly marked curve kink in the motion characteristic and the stroboscopic range ($t_2-t_1$) nearly disappears.

The alteration of the motion relations may be in similarly advantageous manner carried out for shutters with differently constructed drive devices, using suitable means, for example, a stepped spring device or an oil pressure brake with controlled brake operation may be employed in the case of shutters operated by spring motors. Changes may be made within the scope and spirit of the appended claims.

I claim:

1. X-ray apparatus comprising a device for screening secondary radiations from the photographic element that is to be exposed to the action of the X-rays, said device comprising a screening shutter, a motor, drive means actuated by said motor for reciprocating said shutter, control means coupled with said drive means for causing said shutter to move in one direction only of its reciprocating motion with decreasing speed, and further control means governed by said drive means for effecting the X-ray exposure at a time when said shutter moves with decreasing speed in said one direction of its reciprocating motion.

2. X-ray apparatus according to claim 1, wherein said shutter is moved in said one direction of motion initially with high speed lying above stroboscopic speed and thereafter with a decreasing speed lying below stroboscopic speed.

3. X-ray apparatus according to claim 2, wherein the range of motion of said shutter at substroboscopic speed is a multiple of the range of motion thereof at superstroboscopic speed.

4. A structure according to claim 3, comprising means for executing the transition from superstroboscopic to substroboscopic speed during a time interval which is so short that a stroboscopic effect is practically excluded incident to X-ray exposure during such transition.

5. A structure according to claim 2, comprising means for causing a decrease in the acceleration of the shutter at the points of reversal of motion thereof.

6. A structure according to claim 2, comprising means for causing the duration of shutter motion with decreasing speed to be greater than the duration of motion thereof in opposite direction.

7. A structure according to claim 2, wherein said control means comprises a cam driven by said motor, and means for operatively interconnecting said cam with said shutter.

8. A structure according to claim 7, comprising means for effecting said X-ray exposure within the range of superstroboscopic motion of said shutter.

9. A structure according to claim 1, comprising means for effecting said X-ray exposure within the range of motion of said shutter in which such shutter moves in a direction opposite to the direction of decreasing speed thereof.

10. A structure according to claim 9, comprising a pair of motor-driven cams constituting said further control means for effecting said X-ray exposure, and a delay contact co-operating with said cams, whereby said exposure is effected by one of said cams with said delay contact bridged in one direction of motion of said shutter and by the other of said cams with said delay contact effective during motion of said shutter in opposite direction.

11. A structure defined in claim 7, comprising means for stopping said shutter in a predetermined phase position after at least one full cycle of reciprocation thereof.

12. A structure defined in claim 11, wherein said motor is an electric motor, a switch-in contact for said motor, a normal contact in parallel with said switch-in contact, means for opening said normal contact in a defined phase of motion of said shutter, and means for limiting the inertia motion of said motor after opening the circuit thereof.

13. A structure according to claim 12, comprising a cam for controlling said normal contact.

14. A structure according to claim 12, comprising an adjustable cam operated by said motor for stopping said shutter in desired phase position.

15. A structure defined in claim 12, comprising a brake for limiting the inertia motion of said shutter.

16. A structure according to claim 7, wherein said cam is an elongated disk of substantially elliptical configuration, the axis of rotation of said cam being eccentric to the long axis thereof.

17. A structure according to claim 7, comprising a tubular member, one edge of said tubular member forming a curve constituting said cam for controlling the motion of said shutter.

18. A structure according to claim 7, wherein the marginal curve of said cam is flattened at portions thereof which correspond to the points of reversal of motion of said shutter.

19. A structure according to claim 7, wherein a depression is formed in the marginal curve of said cam at a portion thereof which corresponds to the area of motion of said shutter at stroboscopic speed.

References Cited in the file of this patent

UNITED STATES PATENTS

| | | |
|---|---|---|
| 2,062,562 | Dent | Dec. 1, 1936 |
| 2,193,330 | Grossmann | Mar. 12, 1940 |
| 2,205,209 | Kunz et al. | June 18, 1940 |
| 2,591,536 | Gieringer et al. | Apr. 1, 1952 |